(12) United States Patent
Kojukhov et al.

(10) Patent No.: US 11,888,685 B1
(45) Date of Patent: Jan. 30, 2024

(54) SYSTEM, METHOD, AND COMPUTER PROGRAM FOR A MODEL DRIVEN NON-REAL TIME RADIO INTELLIGENT CONTROLLER (RIC) FOR O-RAN MANAGEMENT AND ORCHESTRATION

(71) Applicant: Amdocs Development Limited, Limassol (CY)

(72) Inventors: Andrei Kojukhov, Rishon le Zion (IL); Avi Chapnick, Ramat Gan (IL); Borislav Glozman, Ramat Gan (IL); Roy Segal, Mishmar-David (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/109,147

(22) Filed: Feb. 13, 2023

(51) Int. Cl.
*H04L 41/0806* (2022.01)
*H04L 41/084* (2022.01)

(52) U.S. Cl.
CPC ........ *H04L 41/0806* (2013.01); *H04L 41/084* (2013.01); *H04L 41/0843* (2013.01)

(58) Field of Classification Search
None
See application file for complete search history.

(56) References Cited

U.S. PATENT DOCUMENTS

| | | | | |
|---|---|---|---|---|
| 11,337,131 | B1* | 5/2022 | Parekh | H04W 36/38 |
| 11,546,878 | B1* | 1/2023 | Xu | H04W 68/025 |
| 11,601,819 | B2* | 3/2023 | Chou | H04W 16/10 |
| 11,671,925 | B2* | 6/2023 | Chen | H04W 52/146 |
| | | | | 370/328 |
| 2021/0184989 | A1* | 6/2021 | Wu | G06F 18/214 |
| 2022/0248296 | A1* | 8/2022 | Merwaday | H04W 36/30 |
| 2022/0322181 | A1* | 10/2022 | Parekh | H04W 28/0268 |
| 2022/0369265 | A1* | 11/2022 | He | H04W 56/0065 |
| 2022/0369336 | A1* | 11/2022 | Huang | H04W 72/569 |
| 2022/0377754 | A1* | 11/2022 | Chisci | H04W 72/1215 |
| 2022/0407664 | A1* | 12/2022 | Wang | H04W 52/0206 |
| 2023/0044847 | A1* | 2/2023 | Palanigounder | H04W 8/26 |
| 2023/0127705 | A1* | 4/2023 | Ozturk | H04W 76/19 |
| | | | | 370/329 |
| 2023/0164688 | A1* | 5/2023 | Kumar | H04W 52/18 |
| | | | | 455/522 |
| 2023/0267833 | A1* | 8/2023 | Michalek | G08G 1/0965 |
| | | | | 340/903 |

* cited by examiner

*Primary Examiner* — Backhean Tiv
(74) *Attorney, Agent, or Firm* — Zilka-Kotab, P.C.

(57) ABSTRACT

As described herein, a system, method, and computer program are provided for a model driven Non-RT RIC design for O-RAN management and orchestration. One or more features of one or more onboarded Non-RT RIC applications are determined. During run-time of the Non-RT RIC, a set of components are deployed for the Non-RT RIC based on the one or more features of the one or more onboarded Non-RT RIC applications.

20 Claims, 5 Drawing Sheets

SYSTEM, METHOD, AND COMPUTER PROGRAM FOR A MODEL DRIVEN NON-REAL TIME RADIO INTELLIGENT CONTROLLER (RIC) FOR O-RAN MANAGEMENT AND ORCHESTRATION

FIELD OF THE INVENTION

The present invention relates to open radio access network (O-RAN) management and orchestration in 5G networks.

BACKGROUND

Today's mobile network industry is busy developing the Open Radio Access Network (O-RAN) approach for 5G networks. This approach includes developing the Open application programming interfaces (APIs) for managing and orchestration of 5G RAN network functions, including: Physical Network Function (PNF), Virtual Network Function (VNF), and Cloud Native Function (CNF). In order to optimize the RAN management operations all together with its openness, 5G RAN heavily relies on Artificial Intelligence (AI) and analytics.

A RAN Intelligent Controller (RIC) is currently being developed by the O-RAN community to implement particular RAN optimization use cases and AI features. For instance, among such features are well known Self-Organizing Network (SON) features developed by 3GPP. A main difference from legacy SON features is that the O-RAN architecture requires a new design of SON (and other) optimization applications by dividing them into two parts: Non-Real Time (Non-RT) and Near-Real Time (Near RT).

O-RAN is developing the RIC by splitting it into two parts: Non-RT RIC and Near-RT RIC. According to the O-RAN architecture, the Non-RT RIC is planned to be part of the RAN Management and Orchestration level. One of the most popular orchestration engines for O-RAN Network Functions is the flexible and model driven TOSCA orchestration approach developed by OASIS and the European Telecommunication Standards Institute (ETSI) Network Function Virtualization (NFV) community. However, such approach has not been leveraged with respect to the development of the Non-RT RIC. Instead, the Open Source based solutions developed by the Open Network Automation Platform (ONAP) and O-RAN are complicated and not flexible.

There is thus a need for addressing these and/or other issues associated with the prior art. For example, taking into account that the Non-RT RIC is part of the O-RAN Management and Orchestration and the fact that its constituents are not permanent and may vary among deployments, there is a need to for a model driven Non-Real Time RIC design.

SUMMARY

As described herein, a system, method, and computer program are provided for a model driven Non-RT RIC design for O-RAN management and orchestration. One or more features of one or more onboarded Non-RT RIC applications are determined. During run-time of the Non-RT RIC, a set of components are deployed for the Non-RT RIC based on the one or more features of the one or more onboarded Non-RT RIC applications.

DETAILED DESCRIPTION

The present description relates to the implementation of a Non-RT RIC in a O-RAN structured 5G network. The Non-RT RIC is an application-defined component of the O-RAN architecture that is responsible for controlling and optimizing RAN functions in the 5G network. In accordance with the O-RAN architecture, the Non-RT RIC will be implemented as part of the O-RAN Management and Orchestration and its constituents are not permanent and may vary among deployments of the Non-RT RIC (i.e. Non-RT RIC service instances). Accordingly, the present disclosure provides a model driven Non-Real Time RIC design to allow for flexibility of a deployed Non-Real Time RIC.

Figure 1:
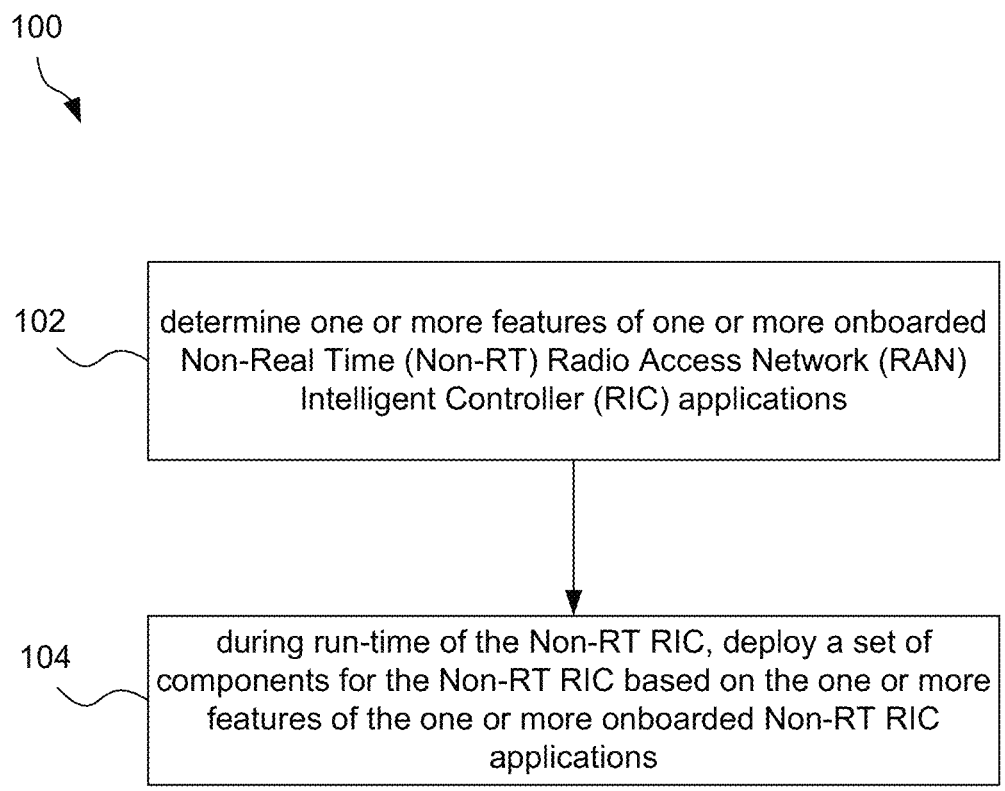
FIG. 1 illustrates a method for a model driven Non-RT RIC design for O-RAN management and orchestration, in accordance with one embodiment.

FIG. 1 illustrates a method 100 for a model driven Non-RT RIC design for O-RAN management and orchestration, in accordance with one embodiment. The method 100 may be carried out by a computer system, such as that described below with respect to FIGS. 4 and/or 5.

In operation 102, one or more features of one or more onboarded Non-RT RIC applications are determined. With respect to the present embodiment, the onboarded Non-RT RIC applications refer to applications deployed as part of the Non-RT RIC at a given point in time. The one or more features of the Non-RT RIC applications refer to any features of the applications that indicate a requirement for certain components of the Non-RT RIC.

In one embodiment, the one or more features of the one or more onboarded Non-RT RIC applications may include at least one capability required by the one or more onboarded Non-RT RIC applications. In another embodiment, the one or more features of the one or more onboarded Non-RT RIC applications may include at least one component required by the one or more onboarded Non-RT RIC applications. In another embodiment, the one or more features of the one or more onboarded Non-RT RIC applications may include at least one capability provided by the one or more onboarded Non-RT RIC applications. In yet another embodiment, the one or more features of the one or more onboarded Non-RT RIC applications may include at least one component provided by the one or more onboarded Non-RT RIC applications.

In operation 104, during run-time of the Non-RT RIC, a set of components are deployed for the Non-RT RIC based on the one or more features of the one or more onboarded Non-RT RIC applications. The set of components refer to one or more components that support the one or more features of the one or more onboarded Non-RT RIC applications. In an embodiment, the components in the set of components may be functional components, such as sub-services. Deploying the set of components may refer to instantiating, within the network, the one or more components in the set.

In an embodiment, the one or more features may be determined (in operation 102) when the one or more Non-RT RIC applications are onboarded. In this case, the set of components may be dynamically deployed (in operation 104) when the one or more features are determined. Accordingly, the components of the Non-RT RIC that are deployed may change as the onboarded Non-RT RIC applications change.

In one embodiment, a service template (i.e. model) for the Non-RT RIC may be defined with an initial set of components. The service template may be defined using a TOSCA model. In a further embodiment, the set of components may be included in the initial set of components. In other words the components in the set may be deployed from the service template (i.e. from those components included in the initial set of components). These components may each be an anchor inside, an anchor outside, or a non-anchor capable of being inside or outside.

In one implementation, the Non-RT RIC may be included in a SMO component of an O-RAN. In this implementation, a framework of the Non-RT RIC may enable a variable number of components to be deployed for a Non-RT RIC service instance. Thus, as described above, the components that are deployed may depend on the Non-RT RIC applications that have been onboarded.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
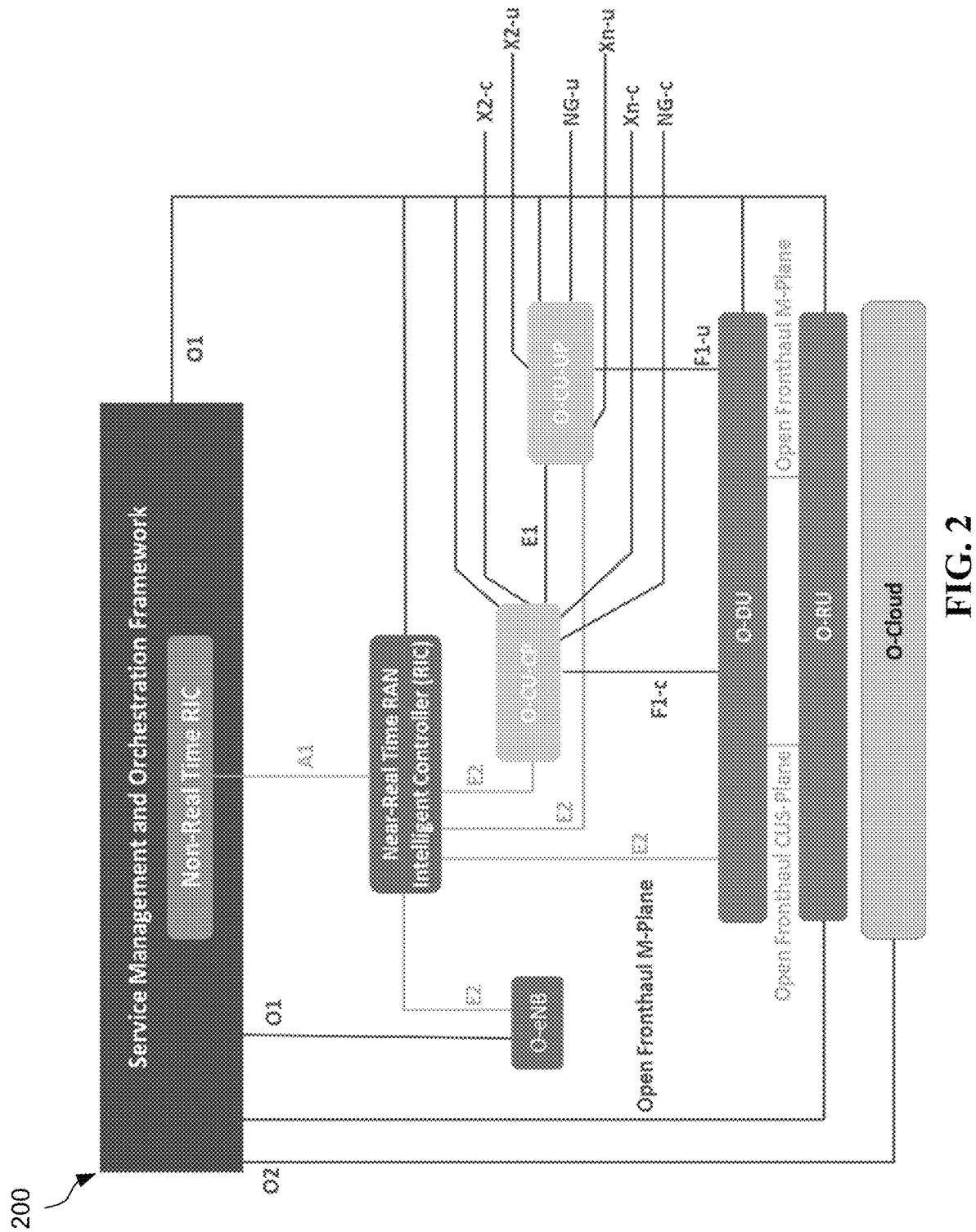
FIG. 2 illustrates a system in which a 5G RAN Network management and orchestration developed by O-RAN is based on a Service Management and Orchestration (SMO) component, in accordance with one embodiment.

FIG. 2 illustrates a system 200 in which a 5G RAN Network management and orchestration developed by O-RAN is based on a SMO component, in accordance with one embodiment.

As shown, O-RAN includes both a Non-RT RIC and a RT RIC. However, only the Non-RT RIC is included as a component of the SMO of the O-RAN.

Figure 3:
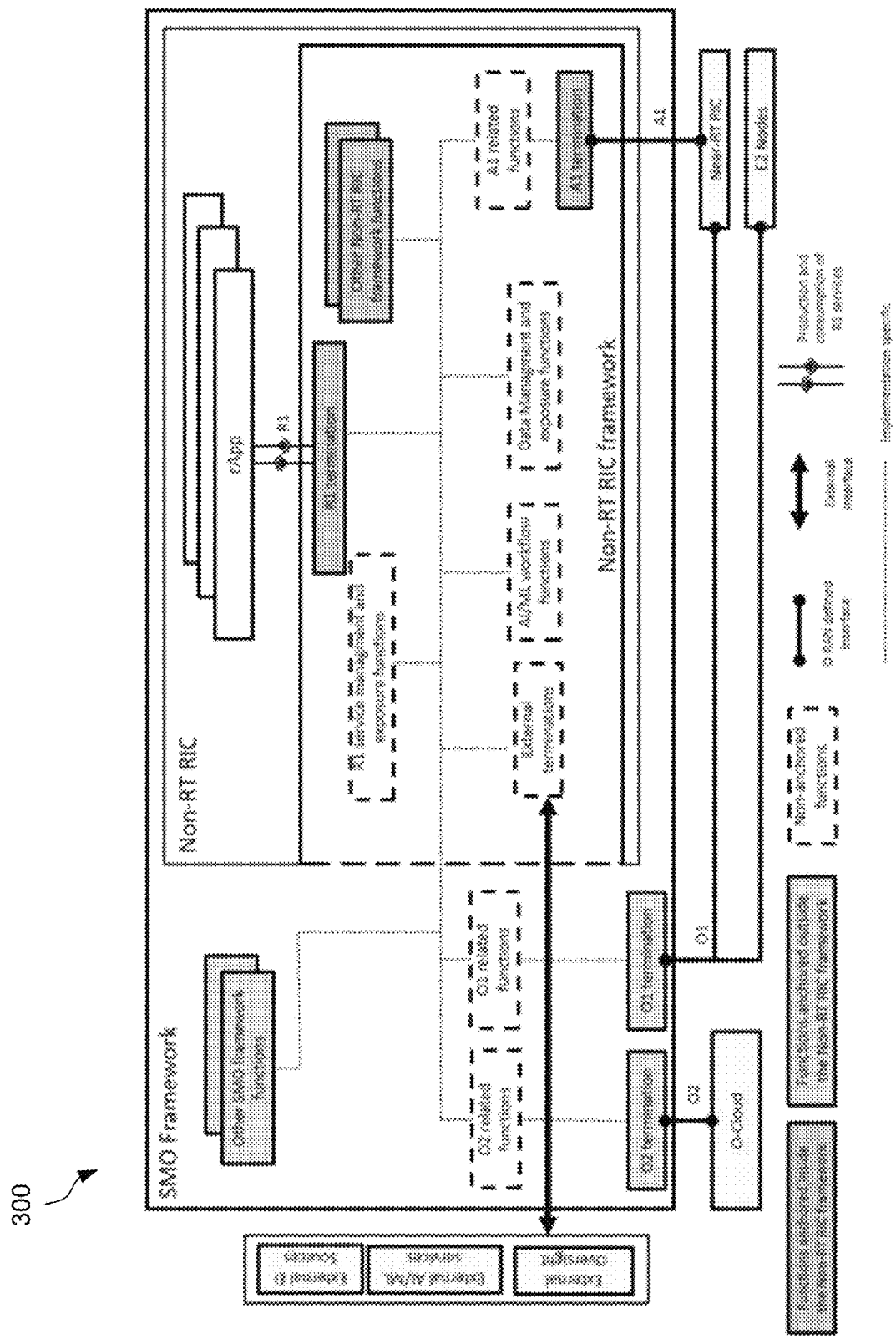
FIG. 3 illustrates a system providing a model driven Non-RT RIC design for O-RAN management and orchestration, in accordance with one embodiment.

FIG. 3 illustrates a system 300 providing a model driven Non-RT RIC design for O-RAN management and orchestration, in accordance with one embodiment.

As shown, the Non-RT RIC is part of the SMO. The Non-RT RIC framework may support a variable number of functional components where some of them are anchors inside, outside or non-anchored (may be either inside or outside).

The Non-RT RIC design solution of the present description leverages the model driven (e.g. TOSCA-based) approach. This means that the topology of the Non-RT RIC service template may be designed by a Service Design tool with a predefined initial set of sub-services (Non-RT RIC components). During run-time, the set of components included in the Non-RT RIC service instance may be changed based on introduction and registration of new capabilities/components required/provided by newly onboarded Non-RT RIC applications (i.e. illustrated as rApp's as part of Non-RT RIC).

Figure 4:
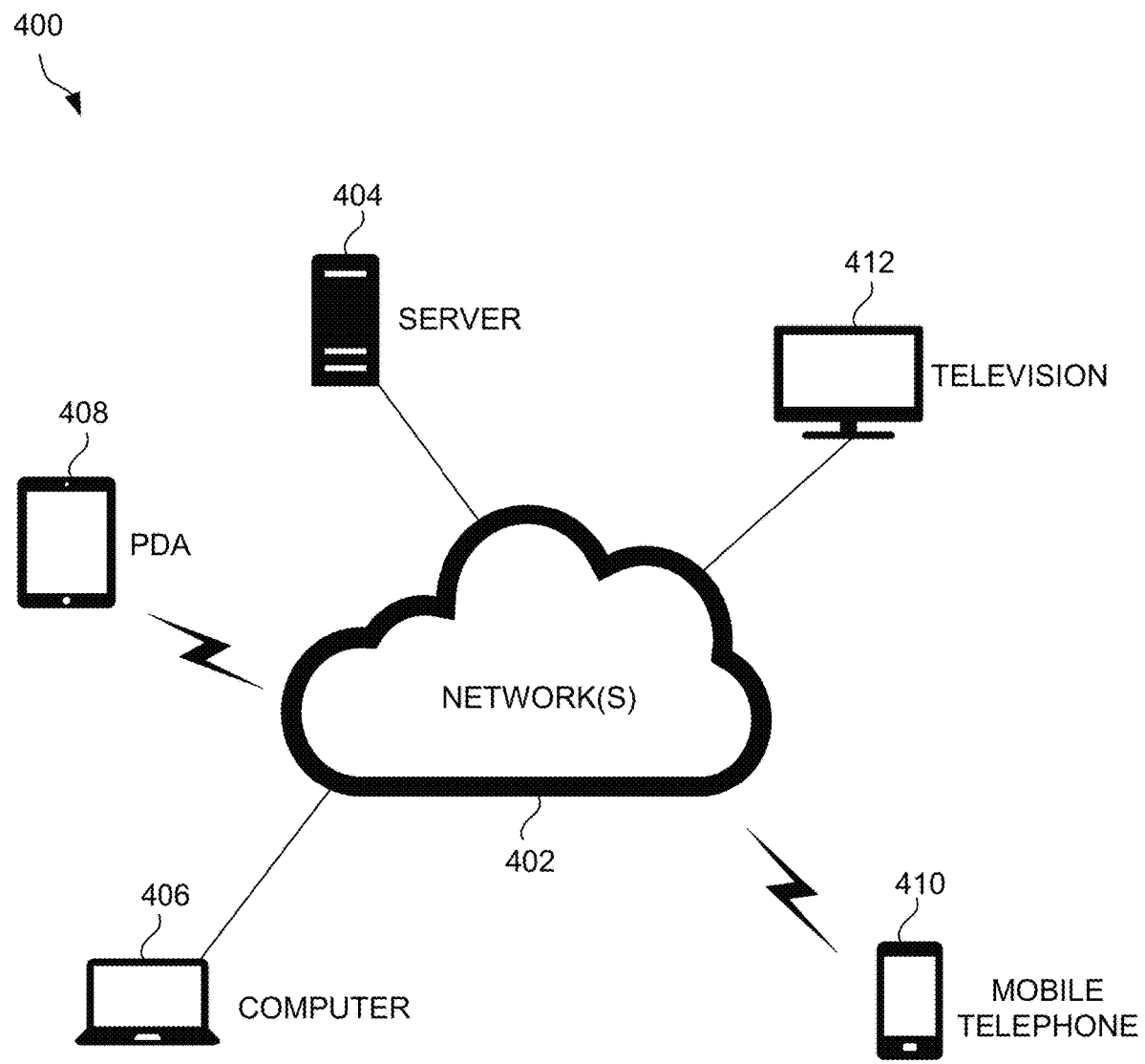
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
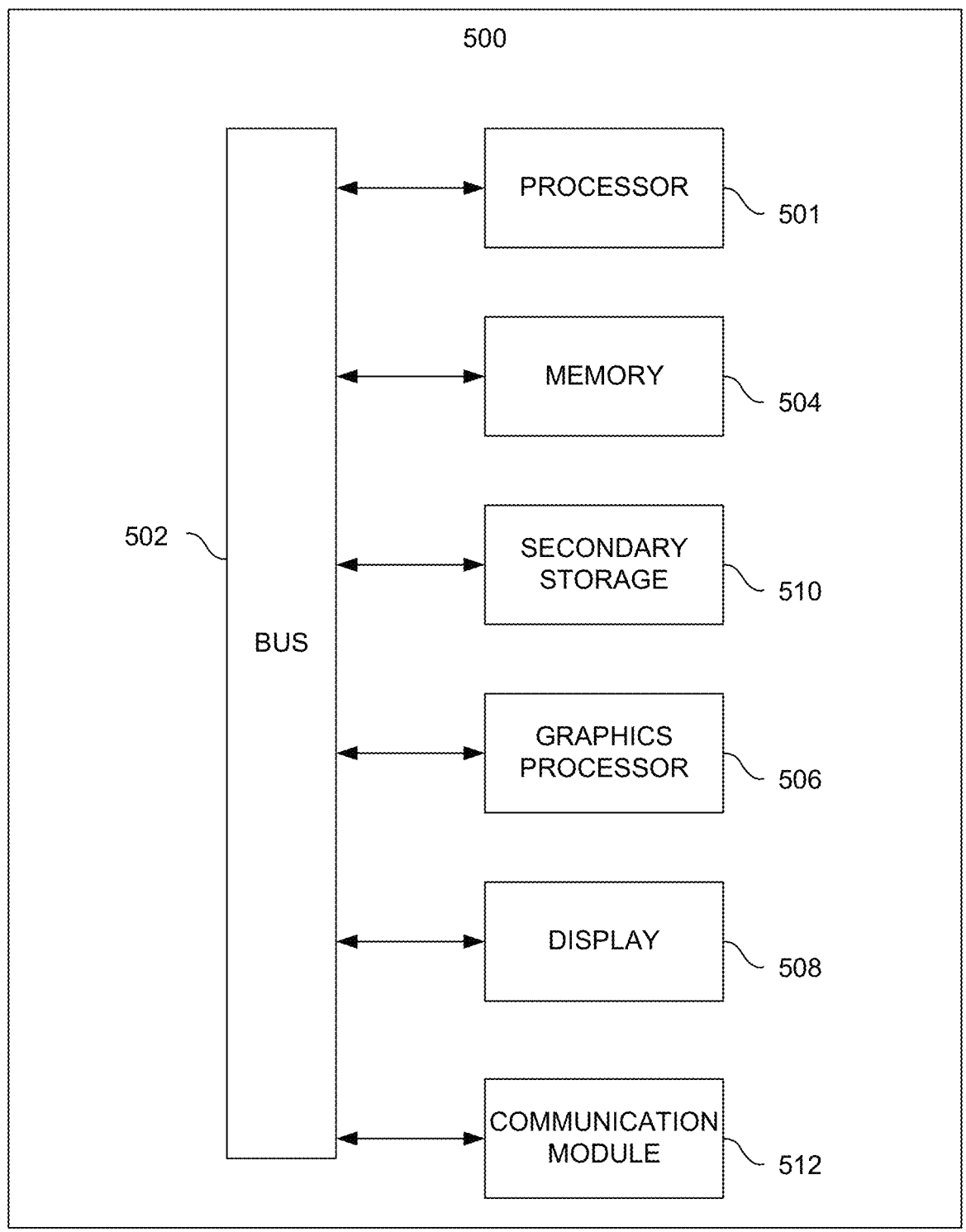
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   determine one or more features of one or more onboarded Non-Real Time (Non-RT) Radio Access Network (RAN) Intelligent Controller (RIC) applications; and
   during run-time of the Non-RT RIC, deploy a set of components for the Non-RT RIC based on the one or more features of the one or more onboarded Non-RT RIC applications.

2. The non-transitory computer-readable media of claim 1, wherein the one or more features of the one or more onboarded Non-RT RIC applications include at least one capability required by the one or more onboarded Non-RT RIC applications.

3. The non-transitory computer-readable media of claim 1, wherein the one or more features of the one or more onboarded Non-RT RIC applications include at least one component required by the one or more onboarded Non-RT RIC applications.

4. The non-transitory computer-readable media of claim 1, wherein the one or more features of the one or more onboarded Non-RT RIC applications include at least one capability provided by the one or more onboarded Non-RT RIC applications.

5. The non-transitory computer-readable media of claim 1, wherein the one or more features of the one or more onboarded Non-RT RIC applications include at least one component provided by the one or more onboarded Non-RT RIC applications.

6. The non-transitory computer-readable media of claim 1, wherein the one or more features are determined when the one or more Non-RT RIC applications are onboarded.

7. The non-transitory computer-readable media of claim 6, wherein the set of components are dynamically deployed when the one or more features are determined.

8. The non-transitory computer-readable media of claim 1, wherein a service template for the Non-RT RIC is defined with an initial set of components.

9. The non-transitory computer-readable media of claim 8, wherein the service template is defined using a TOSCA model.

10. The non-transitory computer-readable media of claim 8, wherein the set of components is included in the initial set of components.

11. The non-transitory computer-readable media of claim 8, wherein the set of components are deployed from the service template.

12. The non-transitory computer-readable media of claim 1, wherein the components are sub-services.

13. The non-transitory computer-readable media of claim 1, wherein the Non-RT RIC is included in a Service Management and Orchestration (SMO) component of an Open Radio Access Network (O-RAN).

14. The non-transitory computer-readable media of claim 13, wherein a framework of the Non-RT RIC enables a variable number of components to be deployed for a Non-RT RIC service instance.

15. The non-transitory computer-readable media of claim 14, wherein the components are functional components.

16. The non-transitory computer-readable media of claim 15, wherein at least one of the components is an anchor inside.

17. The non-transitory computer-readable media of claim 15, wherein at least one of the components is an anchor outside.

18. The non-transitory computer readable media of claim 15, wherein at least one of the components is a non-anchor capable of being inside or outside.

19. A method, comprising:
at a computer system:
determining one or more features of one or more onboarded Non-Real Time (Non-RT) Radio Access Network (RAN) Intelligent Controller (RIC) applications; and
during run-time of the Non-RT RIC, deploying a set of components for the Non-RT RIC based on the one or more features of the one or more onboarded Non-RT RIC applications.

20. A system, comprising:
a non-transitory memory storing instructions; and
one or more processors in communication with the non-transitory memory that execute the instructions to:
determine one or more features of one or more onboarded Non-Real Time (Non-RT) Radio Access Network (RAN) Intelligent Controller (RIC) applications; and
during run-time of the Non-RT RIC, deploy a set of components for the Non-RT RIC based on the one or more features of the one or more onboarded Non-RT RIC applications.

\* \* \* \* \*